(No Model.)

H. S. BRISCOE.
HORSESHOE.

No. 445,000. Patented Jan. 20, 1891.

WITNESSES:
Frances McArdle
C. Sedgwick

INVENTOR:
H. S. Briscoe
BY
Munn & Co
ATTORNEYS

UNITED STATES PATENT OFFICE.

HENRY S. BRISCOE, OF MORRISONVILLE, ILLINOIS.

HORSESHOE.

SPECIFICATION forming part of Letters Patent No. 445,000, dated January 20, 1891.

Application filed September 19, 1890. Serial No. 365,460. (No model.)

*To all whom it may concern:*

Be it known that I, HENRY S. BRISCOE, of Morrisonville, in the county of Christian and State of Illinois, have invented a new and useful Improvement in Horseshoes, of which the following is a full, clear, and exact description.

My invention is an improvement in that class of horseshoes which are attached to the hoof without the aid of nails by means of one or more metal bands and bars that connect with the sides and front of the shoe and are made adjustable in respect to tension in order to adapt them for hoofs of different sizes.

To this end my invention consists in certain features of construction and combination of parts, as is hereinafter described and claimed.

Reference is to be had to the accompanying drawings, forming a part of this specification, in which similar letters of reference indicate corresponding parts in both the figures.

Figure 1:
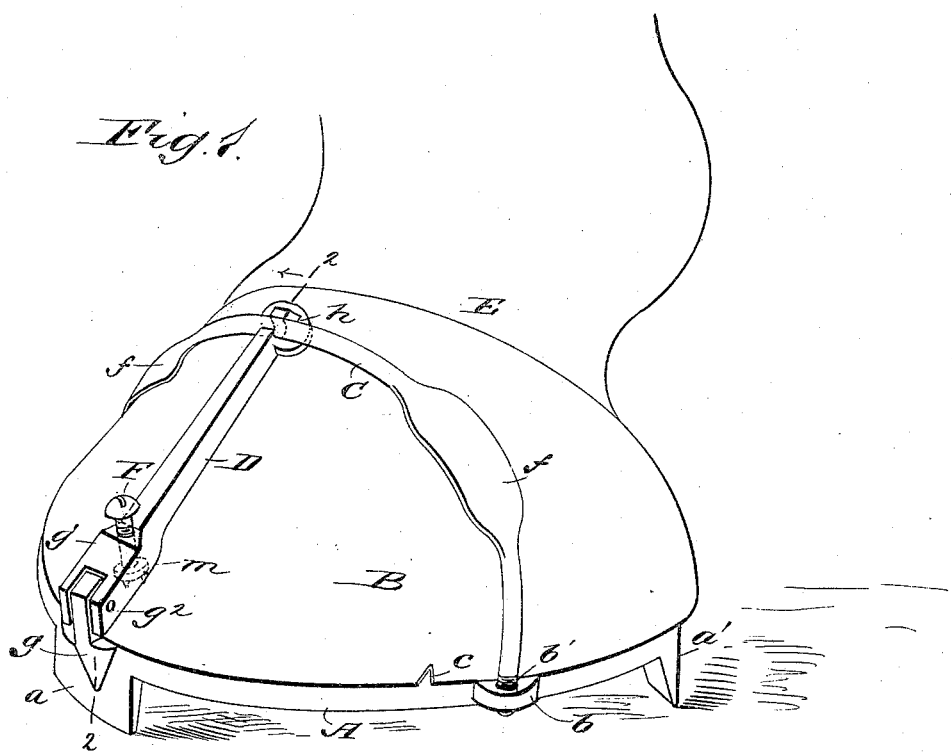
Figure 2:
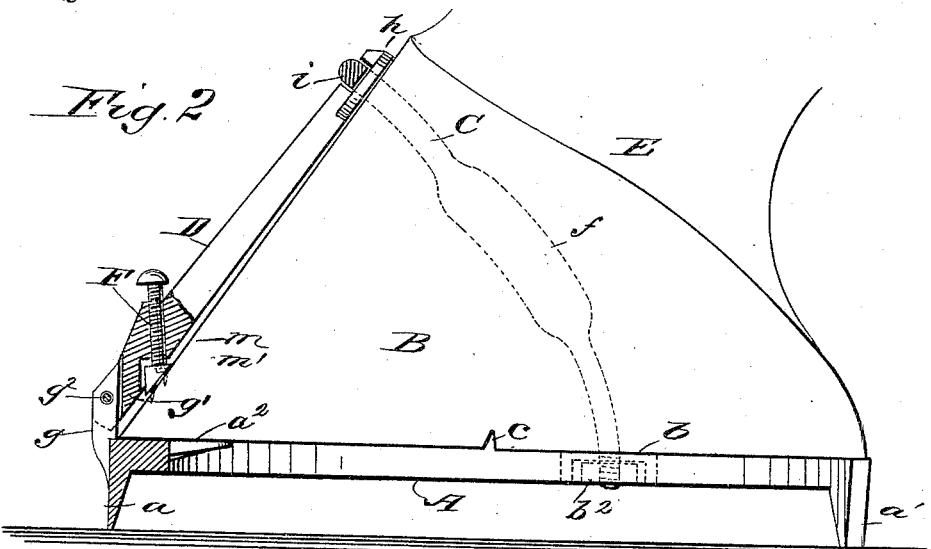

Figure 1 is a perspective view of a horse's hoof and the improved adjustable shoe in place on it, and Fig. 2 is a sectional side elevation of the adjustable horseshoe on the hoof of the animal.

The shoe A in its contour is adapted to suit the shape of the hoof B, and is of ordinary construction with regard to its face bearing upon the hoof, it being bent from a metallic bar having a proper breadth and thickness, and the usual toe and heel calks $a\ a'$, preferably made integral with the shoe, are provided.

At opposite points on the curved limbs of the shoe A, nearer the terminals $a'$ than the toe $a$, similar ears $b$ are formed on said limbs, which are vertically perforated for the reception of the depending threaded ends $b'$ of a curved clamping-bar C, which perforations are countersunk on the lower side of the shoe-limbs to receive nuts that engage these ends of the clamping-bar, as will be further explained.

In front of and near to the ears $b$ an upwardly-projecting V-shaped rib $c$ is formed on each limb of the shoe A at opposite points, which ribs are fitted closely into corresponding notches made in the surface of the hoof whereon the shoe bears, the ribs extending across the top face of the limbs of the shoe, whereby the shoe will be prevented from longitudinal displacement when it is clamped closely against the hoof of the animal to be shod.

The clamping-bar C is given a curvature which will adapt it to fit closely upon the hoof B when applied, and said bar, which is rounded on its upper side and flat where it bears upon the hoof, is laterally widened near its ends $b'$, producing bearing-pads $f$, which will distribute the pressure of the bar on the hoof over a greater area of surface when the bar is secured to the shoe.

Upon the outer side of the toe-calk $a$ an upwardly-extending lug $g$ is formed, which is located near the median line of the shoe, longitudinally considered, and on the inner edge of the shoe-toe, opposite the lug $g$, an integral ear $a^2$ is formed that conforms on its upper face with the general surface of the shoe that bears upon the hoof B, said ear forming an extended bearing for the shoe at its toe, as shown in Fig. 2. A locking-bar D, which is bifurcated at its lower end $g'$, loosely embraces and is pivoted at $g^2$ to the lug $g$, the upper end of said bar having a lateral flanged enlargement $h$ formed on it for a bearing-contact on the hoof B, near the pastern E of the animal's foot.

The locking-bar D is notched transversely above the flanged enlargement $h$, and the crown of the arched clamping-bar C is neatly fitted in said notch, so that the upper end of the bar D and the clamping-bar are interlocked at the point $i$.

A sufficient length is given to the threaded end portions $b'$ of the clamping-bar C to allow them to project through the ears $b$ and receive the binding-nuts $b^2$, which by their adjustment draw the shoe A into close contact with the hoof B.

As the clamping-pressure of the curved bar C serves to hold the shoe A firmly in place near the heel-calks $a'$, it is necessary to provide means for securing the toe portion of the shoe in a like manner upon the forward part of the hoof B. To this end a set-screw F is provided, which is inserted through a threaded hole in the locking-bar D, near the bifurcated end portion $g'$ of said bar, which latter is cut away on its lower surface to afford room for the introduction of the presser-block $m$, which is swivel-jointed to the lower end of the set-screw F, and adapted to embed the teeth $m'$, that are formed on its lower surface, in the hoof of the animal.

Having fully described my invention, I claim as new and desire to secure by Letters Patent—

The combination, with a horseshoe having calks on its heels and toe, opposite perforated ears on its side limbs, an upwardly-projecting lug on its toe, and transverse ribs on its top face entering mating grooves in the hoof, of a locking-bar bifurcated at its lower end and pivoted thereat to the lug on the shoe and laterally enlarged at the upper end and cross-grooved above said flanged enlargement, an arched clamping-bar having threaded ends passing through the ears on the shoe and provided with nuts, and a set-screw adjustable in the locking-bar near its lower end and provided with a swiveled presser-block having tangs on its lower face, substantially as set forth.

HENRY S. BRISCOE.

Witnesses:
BENJAMIN PRICE,
MARTIN LUTHER.